United States Patent [19]

Pfestorf

[11] Patent Number: 5,073,213
[45] Date of Patent: Dec. 17, 1991

[54] PROCESS FOR APPLYING A PHOSPHATE SLIDING LAYER TO A BEARING METAL LAYER

[75] Inventor: Harald Pfestorf, Untereisesheim, Fed. Rep. of Germany

[73] Assignee: Kolbenschmidt Aktiengesellschaft, Neckarsulm, Fed. Rep. of Germany

[21] Appl. No.: 525,506

[22] Filed: May 18, 1990

[30] Foreign Application Priority Data

May 20, 1989 [DE] Fed. Rep. of Germany ....... 3916498

[51] Int. Cl.$^5$ ............................................. C23C 22/00
[52] U.S. Cl. .................................... 148/262; 148/246
[58] Field of Search ................................ 148/246, 262

[56] References Cited

U.S. PATENT DOCUMENTS

| 2,310,381 | 2/1943 | Zenner | 148/262 |
| 2,477,841 | 8/1949 | Ward | 148/262 |
| 2,500,673 | 3/1950 | Gibson | 148/262 |
| 3,619,300 | 11/1971 | Heller | 148/262 |

*Primary Examiner*—Sam Silverberg
*Attorney, Agent, or Firm*—Sprung Horn Kramer & Woods

[57] ABSTRACT

In order to ensure in sliding surface bearings a uniform distribution of the load over the bearing metal layer, a phosphate layer serving as a sliding layer has been applied to the bearing metal layer.

In order to ensure a high resistantce to scuffing, the sliding layer is formed from an aqueous phosphating solution which contains 1.5 to 5.0 g/l Zn, 12 to 24 g/l Na, 11 to 22 g/l $P_2O_5$, 17 to 33 g/l 16 to 30 g/l $BF_4$, 20 to 39 g/l $B(OH)_3$ and 1.0 to 6.0 g/l NaF.

9 Claims, No Drawings

PROCESS FOR APPLYING A PHOSPHATE SLIDING LAYER TO A BEARING METAL LAYER

DESCRIPTION

This invention relates to a process of applying a phosphate sliding layer having a thickness of 0.5 to 10 μm, preferably 2 to 8 μm, to bearing metal layers of sliding surface bearing shells, particularly to such shells for a movable mounting of heavy-duty power-transmitting elements in internal combustion engines, preferably to such shells for a movable mounting of crankpins and mainshaft portions of crankshafts, by means of a zinc-containing aqueous phosphating solution.

In modern internal combustion engines a considerable increase of the power without a change of the main dimensions and without a reduction of the reliability and life of the engine and without special requirements regarding the quality of fuel can be achieved by an increase of the speeds and of the effective mean pressure and particularly by the provision of an exhaust-driven supercharger. The adoption of these measures has had the result that, inter alia, the damage to the sliding surface bearing shells for the crankpins and mainshaft portions of the crankshaft occurring in the operation of the engine will considerably restrict the life of interman combustion engines. For this reason those skilled in the art face the object to provide sliding surface bearing shells which are improved in strength and functional reliability.

For instance, it has been attempted to increase the fatigue limit of crankpin bearing shells having a steel backing and on said backing a bearing material layer consisting of a lead bronze alloy, which is provided with an electrodeposited sliding layer, so that said bearings will meet the increased requirements. This has been accomplished in that the thickness of the electrodeposited sliding layer has been decreased. Whereas that measure has resulted in a higher fatigue limit particularly of the sliding layer, it was not possible thus to decrease the wear so that the bearings were damaged when a sliding contact with the lead bronze alloy of the bearing metal alloy had been established. It has been attempted to improve the wear resistance by an increase of the copper content of the sliding layer form about 3% to about 6% and that measure has sometimes increased the life of crankpin bearings. But it has not been possible in all cases thus to achieve satisfactory operational results.

A higher fatigue limit and very good sliding properties, even when the sliding layer has been worn, are exhibited by composite bearings which comprise a steel backing, by which the fatigue limit of the aluminum bearing alloy clad on said backing is increased, and a thin sliding layer of a lead or tin alloy which has been electrodeposited on the bearing alloy layer is a thickness of 3 to 30 μm. As a rule, an interlayer of nickel is provided between the aluminum bearing alloy and the sliding layer in order to ensure a satisfactory adhesion of the sliding layer to the aluminum bearing alloy (Technisches Handbuch, Karl Schmidt GmbH, Neckarsulm 1967, pages 231/232).

The aluminum bearing alloys which can be used for the purpose stated above mainly include the alloys of the groups AlSi12CuMgNi, AlZn5SiCuPb and AlZn4.5SiCuPb. Said aluminum bearing alloys comprise an aluminum solid solution matrix in which finely dispersed, heterogeneous, hard silicides and aluminides are included. For this reason those aluminum bearing alloys distinguish by low wear rates and a high fatigue strength and ahve excellent sliding properties in contact with hardened crankpine and mainshaft portions of crankshafts.

In the use of sliding surface bearing shells comprising such bearing alloys an occurrence of local load peaks should be avoided and the load should uniformly be distributed over the bearing metal layer. For this reason it has been disclosed in EP-B-0 059 273 to coat the bearing metal layer with a zinc phosphate layer having a thickness of 2 to 8 μm. As a result, the sliding surface bearing shell can adapt itself to any deviations of the mating members from the prescribed geometric configuration when the bearing is loaded and/or to such deviations which are due to the manufacture of said members and the required running surface can be formed.

It is an object of the present invention so to improve the phosphate sliding surface that layer scuffing will be prevented even in case of a short-time shortage of oil and particularly under extreme conditions.

That object is accomplished in that the outside surface of the bearing metal layer is contacted with an aqueous phosphating solution which contains 1.5 to 5.0 g/l Zn
12 to 24 g/l Na
11 to 22 g/l $P_2O_5$
17 to 33 g/l $NO_3$
16 to 30 g/l $BF_4$
20 to 39 g/l $B(OH)_3$
1.0 to 6.0 g/l NaF.

The process in accordance with the invention can be used to coat all bearing metal layers consisting of white metal, bronze or aluminum bearing alloys. In view of the object set forth the bearing metal layers preferably consist of aluminum bearing alloys of the type AlSi12-CuNiMg, AlSn6Cu, AlZn5SiCuPb or most particularly AlZn4.5SiCuPb.

In a preferred embodiment, the process in accordance with the invention can be used particularly with sliding surface bearing shells which consist of a composite material and in which the bearing metal layer is bonded to a backing layer consisting of steel, high-strength aluminum alloy, cast iron, bronze or the like.

The phosphate layer which has been applied to the bearing surface layer cannot only affect a uniform distribution of the load to the bearing metal layer and an adaptation to any existing geometrical inaccuracies of the bearing shell but will also permit a satisfactory running-in behavior in case of a short-time shortage of oil under extreme loads.

In accordance with a further preferred feature of the process in accordance with the invention the phosphate coating is applied to the bearing metal layer in that the sliding surface bearing shells which have been cleaned in the usual manner are immersed into a zinc-containing aqueous phosphating solution which is at a temperature from 30° to 90° C. and contains 2.1 to 3.5 g/l Zn
13.6 to 22.8 g/l Na
12.2 to 20.3 g/l $P_2O_5$
18.9 to 31.4 g/l $NO_3$
17.3 to 28.8 g/l $BF_4$
22.5 to 37.5 g/l $B(OH)_3$
1.5 to 5.0 g/l NaF for 5 to 30 minutes and are subsequently rinsed in water at a temperature of 30° to 90° C.

A preferred aqueous phosphating solution contains
2.5 to 3.1 g/l Zn
18.0 to 20.0 g/l Na
14.6 to 17.9 g/l $P_2O_5$
22.6 to 27.7 g/l $NO_3$
22.5 to 23.6 g/l $BF_4$
27.0 to 33.0 g/l $B(OH)_3$
1.8 to 4.4 g/l NaF.

In a preferred embodiment of the process in accordance with the invention the bearing metal layer is contacted with a phosphating solution which contains at least one activator of the group consisting of fluoride, hexafluorosilicate, tetrafluoroborate, glycolate, citrate and tartrate. The activators have an accelerating and uniformizing action on the formation of the phosphate layer and control the weight of the phosphate layer per unit of area.

In order to further assist the formation of particularly thin, finely crystalline phosphate layers, it is recommended to use a rinsing bath which contains activating agents e.g., such agents which mainly consist of titanium phosphate.

The process in accordance with the invention will now be explained more in detail with reference to an example.

A plurality of sliding surface bearing shells consisting each of a backing layer of steel and an aluminum bearing metal layer of the type AlZn4.5SiCuPb, which had been clad on the backing layer, were cleaned and were subsequently immerse for 20 minutes in an aqueous phosphating layer which was at a temperature of 75° C. and had the composition stated hereinbefore. The sliding surface bearing shells were subsequently rinsed with warm water at 50° C. and comprised a phosphate sliding layer in a thickness of 2 μm. Said sliding surface bearing shells were subsequently used as bearings for the crankpins and mainshaft portions of a crankshaft of an internal combustion engine. The sliding surface bearing shells were operated under full load for about 300 hours, and for several short periods of time were operated without a supply of lubricating oil. The results of said experiment clearly show that good sliding properties in conjunction with an extremely small wear are ensured in conjunction with a high load-carrying capacity.

I claim:

1. A process of applying a phosphate sliding layer having a thickness of 0.5 to 10 μm to the outside surface of a bearing metal layer by contacting with an aqueous phosphating solution comprising
   1.5 to 5.0 g/l Zn
   12 to 24 g/l Na
   11 to 22 g/l $P_2O_5$
   17 to 33 g/l $NO_3$
   16 to 30 g/l $BF_4$
   20 to 39 g/l $B(OH)_3$
   1.0 to 6.0 g/l NaF.

2. A process according to claim 1 wherein the phosphating solution comprises
   2.1 to 3.5 g/l Zn
   13.6 to 22.8 g/l Na
   12.2 to 20.3 g/l $P_2O_5$
   18.9 to 31.4 g/l $NO_3$
   17.3 to 2<0.8 g/l $BF_4$
   22.5 to 37.5 g/l $B(OH)_3$
   1.5 to 5.0 g/l NaF.

3. A process according to claim 1 wherein the phosphating solution comprises
   2.5 to 3.1 g/l Zn
   18.0 to 20.0 g/l Na
   14.6 to 17.9 g/l $P_2O_5$
   22.6 to 27.7 g/l $NO_3$
   22.5 to 27.7 g/l $BF_4$
   27.0 to 33.0 g/l $B(OH)_3$
   1.8 to 4.4 g/l NaF.

4. A process according to claim 1 wherein the bearing metal layer is a metal selected from the group consisting of white metal, bronze and an aluminum bearing alloy.

5. A process according to claim 1 wherein the bearing metal layer is a metal selected from the group consisting of AlSi12CuNiMg, AlSn6Cu, AlZn5SiCuPb and AlZn4.5SiCuPb.

6. A process according to claim 1 wherein the bearing metal layer is bonded to a backing layer wherein the said backing layer is selected from the group consisting of steel, high-strength aluminum alloy, cast iron, and bronze.

7. A process according to claim 1 wherein the phosphating solution contains at least one activator wherein said activator is selected from the group consisting of fluoride, hexafluorosilicate, tetrafluoroborate, glycolate, citrate and tartrate.

8. A process according to claim 1 wherein said sliding surface bearing layers are treated with said solution at a temperature between 30° and 90° C. for 5 to 30 minutes.

9. A process according to claim 8 wherein the phosphate sliding layer has a thickness of 2 to 8 μm.

* * * * *

UNITED STATES PATENT AND TRADEMARK OFFICE
CERTIFICATE OF CORRECTION

PATENT NO. : 5,073,213

DATED : December 17, 1991

INVENTOR(S) : Harald Pfestorf

It is certified that error appears in the above-identified patent and that said Letters Patent is hereby corrected as shown below:

| | |
|---|---|
| Title Page item: | [54] After "PROCESS " delete " FOR " and substitute -- OF -- |
| Title Page | ABSTRACT: Line 8 after " 33 g/l " insert --$NO_3$,--. |
| Col. 1, line 1 (TITLE) | After " PROCESS " delete " FOR " and substitute -- OF -- |
| Col. 4, line 16 | After " 2 " delete "< 0 " and substitute -- 8 -- |

Signed and Sealed this

Twenty-eighth Day of June, 1994

*Attest:*

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,073,213
DATED : December 17, 1991
INVENTOR(S) : Harald Pfestorf

It is certified that error appears in the above-indentified patent and that said Letters Patent is hereby corrected as shown below:

On the Title Page, Item [54] after "PROCESS" delete "FOR" and substitute --OF--
On the Title Page, Item [57], line 8, after "33 g/l" insert --NO3,--
Column 1, line 1, after "PROCESS" delete "FOR" and substitute --OF--
Column 4, lien 16, after "2" delete "< 0" and substitute --8--.

Signed and Sealed this

Twelfth Day of July, 1994

Attest:

BRUCE LEHMAN

Attesting Officer    Commissioner of Patents and Trademarks